United States Patent
Li et al.

(10) Patent No.: US 10,982,296 B2
(45) Date of Patent: *Apr. 20, 2021

(54) 500 MPA YIELD STRENGTH-GRADED, HIGH-STRETCHABILITY HOT-DIP ALUMINUM-ZINC AND COLOR-COATED STEEL PLATE AND MANUFACTURING METHOD THEREFORE

(71) Applicant: BAOSHAN IRON & STEEL CO., LTD., Shanghai (CN)

(72) Inventors: Jun Li, Shanghai (CN); Dechao Xu, Shanghai (CN); Xin Liu, Shanghai (CN); Zhilong Ding, Shanghai (CN); Yuling Ren, Shanghai (CN); Xuewei Ye, Shanghai (CN); Hengfa Hu, Shanghai (CN); Hongming Chen, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 233 days.

This patent is subject to a terminal disclaimer.

(21) Appl. No.: 15/754,635

(22) PCT Filed: Jul. 25, 2016

(86) PCT No.: PCT/CN2016/091499
§ 371 (c)(1),
(2) Date: Feb. 23, 2018

(87) PCT Pub. No.: WO2017/036260
PCT Pub. Date: Mar. 9, 2017

(65) Prior Publication Data
US 2018/0245175 A1    Aug. 30, 2018

(30) Foreign Application Priority Data

Aug. 28, 2015   (CN) .......................... 201510540305.6

(51) Int. Cl.
B32B 15/08        (2006.01)
B32B 15/04        (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01);
(Continued)

(58) Field of Classification Search
CPC ... C21D 1/52; C21D 9/46; C21D 9/48; C21D 8/0273; C21D 8/0473; C21D 8/0205;
(Continued)

(56) References Cited

U.S. PATENT DOCUMENTS

2004/0161629 A1*  8/2004  McDevitt ................ B32B 15/18
                                                              428/653
2015/0047752 A1    2/2015  Liu et al.
2018/0245176 A1*  8/2018  Li ......................... C21D 8/0226

FOREIGN PATENT DOCUMENTS

CN       102703810 A      10/2012
CN       104831207         8/2015
(Continued)

OTHER PUBLICATIONS

PCT/CN2016/091499 International Search Report and Written Opinion, dated Nov. 11, 2016; PCT/CN2016/091499 PCT Request dated Jul. 25, 2016 and PCT Notification.
(Continued)

Primary Examiner — Michael E. La Villa
(74) Attorney, Agent, or Firm — Thomas Horstemeyer, LLP

(57) ABSTRACT

An aluminium-zinc-hot-dipped and colour-coated steel plate having yield strength of ≥500 MPa and a high elongation and a manufacturing method thereof, with the chemical
(Continued)

components in mass percentage of a substrate of the steel plate being: 0.07-0.15% of C, 0.02-0.5% of Si, 1.3-1.8% of Mn, N≤0.004%, S≤0.01%, Ti≤0.15%, Nb≤0.050%, and the balance being Fe and other inevitable impurities, and meanwhile satisfying the conditions of: (C+Mn/6)≥0.3%; Mn/S≥150; Nb satisfying 0.01%≤(Nb-0.22C-1.1N)≤0.05% where no Ti is contained; Ti satisfying 0.5≤Ti/C≤1.5 where no Nb is contained; and 0.04%≤(Ti+Nb)≤0.2% where Ti and Nb are added in combination. The steel plate has a tensile strength of ≥550 MPa, an elongation after fracture of ≥15%, a good strength and toughness and an excellent corrosion resistance.

19 Claims, 1 Drawing Sheet

(51) Int. Cl.
| | | |
|---|---|---|
| B32B 15/18 | (2006.01) | |
| B32B 15/20 | (2006.01) | |
| C23C 2/12 | (2006.01) | |
| C23C 2/28 | (2006.01) | |
| C23C 2/40 | (2006.01) | |
| C23C 2/06 | (2006.01) | |
| C23F 17/00 | (2006.01) | |
| C21D 6/00 | (2006.01) | |
| C21D 9/46 | (2006.01) | |
| C21D 8/02 | (2006.01) | |
| C22C 38/14 | (2006.01) | |
| C22C 38/12 | (2006.01) | |
| C22C 38/04 | (2006.01) | |
| C22C 38/02 | (2006.01) | |
| C22C 38/00 | (2006.01) | |
| C22C 21/10 | (2006.01) | |
| C22C 18/04 | (2006.01) | |
| C22C 30/06 | (2006.01) | |
| B32B 15/01 | (2006.01) | |
| C21D 9/48 | (2006.01) | |
| C21D 1/52 | (2006.01) | |
| C23C 2/02 | (2006.01) | |
| C21D 8/04 | (2006.01) | |
| C23C 2/26 | (2006.01) | |
| B32B 15/09 | (2006.01) | |
| C22C 38/50 | (2006.01) | |
| C22C 38/28 | (2006.01) | |
| C22C 38/26 | (2006.01) | |
| C22C 38/48 | (2006.01) | |

(52) U.S. Cl.
CPC ............ *B32B 15/043* (2013.01); *B32B 15/08* (2013.01); *B32B 15/09* (2013.01); *B32B 15/18* (2013.01); *B32B 15/20* (2013.01); *C21D 1/52* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C21D 8/0473* (2013.01); *C21D 9/48* (2013.01); *C22C 18/04* (2013.01); *C22C 21/10* (2013.01); *C22C 30/06* (2013.01); *C22C 38/001* (2013.01); *C22C 38/002* (2013.01); *C22C 38/02* (2013.01); *C22C 38/04* (2013.01); *C22C 38/12* (2013.01); *C22C 38/14* (2013.01); *C22C 38/26* (2013.01); *C22C 38/28* (2013.01); *C22C 38/48* (2013.01); *C22C 38/50* (2013.01); *C23C 2/02* (2013.01); *C23C 2/06* (2013.01); *C23C 2/12* (2013.01); *C23C 2/26* (2013.01); *C23C 2/28* (2013.01); *C23C 2/40* (2013.01); *C23F 17/00* (2013.01); *C21D 2211/002* (2013.01); *C21D 2211/003* (2013.01); *C21D 2211/004* (2013.01); *C21D 2211/005* (2013.01); *C21D 2211/008* (2013.01); *Y10T 428/12556* (2015.01); *Y10T 428/12562* (2015.01); *Y10T 428/12569* (2015.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/26* (2015.01)

(58) Field of Classification Search
CPC .. C21D 8/0226; C21D 8/0236; C21D 8/0263; C21D 8/0278; C21D 6/005; C21D 6/008; C21D 2211/004; C21D 2211/002; C21D 2211/005; C21D 2211/008; C21D 2211/003; B32B 15/012; B32B 15/013; B32B 15/043; B32B 15/08; B32B 15/18; B32B 15/20; B32B 15/04; B32B 15/09; C23C 2/02; C23C 2/26; C23C 2/28; C23C 2/06; C23C 2/12; C23C 2/40; C22C 38/001; C22C 38/002; C22C 38/04; C22C 38/02; C22C 38/12; C22C 38/14; C22C 38/26; C22C 38/48; C22C 38/50; C22C 18/04; C22C 21/10; C22C 30/06; C23F 17/00; Y10T 428/12556; Y10T 428/12562; Y10T 428/12569; Y10T 428/12757; Y10T 428/12799; Y10T 428/12951; Y10T 428/12958; Y10T 428/12965; Y10T 428/12993; Y10T 428/12972; Y10T 428/26
See application file for complete search history.

(56) References Cited

FOREIGN PATENT DOCUMENTS

| CN | 105063484 A | | 11/2015 | |
|---|---|---|---|---|
| IN | 201637005694 | * | 6/2016 | |
| JP | S6223976 | | 1/1987 | |
| JP | H0394018 | | 4/1991 | |
| JP | H0849055 | | 2/1996 | |
| JP | 2002004018 | | 1/2002 | |
| JP | 2007015000 | | 1/2007 | |
| JP | 2013139591 | | 7/2013 | |
| KR | 20130023712 | | 3/2013 | |
| RU | 2312162 | | 12/2007 | |
| WO | 2010119971 A1 | | 10/2010 | |
| WO | 2012002565 A1 | | 1/2012 | |
| WO | 2010137317 | | 11/2012 | |
| WO | 2013046693 A1 | | 4/2013 | |
| WO | WO-2015059903 A1 | * | 4/2015 | ............ C22C 38/06 |

OTHER PUBLICATIONS

Japanese Office Action dated Mar. 5, 2019 for JP Application Patent No. 2018-511023.

Office Action dated Jan. 23, 2020 for Russian Patent Application No. 2018112072.

* cited by examiner

500 MPA YIELD STRENGTH-GRADED, HIGH-STRETCHABILITY HOT-DIP ALUMINUM-ZINC AND COLOR-COATED STEEL PLATE AND MANUFACTURING METHOD THEREFORE

CROSS-REFERENCE TO RELATED APPLICATIONS

This application is a 371 U.S. National Phase of PCT International Application No. PCT/CN2016/091499, filed on Jul. 25, 2016, which claims benefit and priority to Chinese patent application No. 201510540305.6, filed on Aug. 28, 2015. Both of the above-referenced applications are incorporated by reference herein in their entirety.

TECHNICAL FIELD

The present invention belongs to the technical field of the production of cold-rolled plates, and relates to an aluminium-zinc-hot-dipped and colour-coated steel plate having a yield strength grade of ≥500 MPa and a high elongation and a manufacturing method for the aluminium-zinc-hot-dipped and colour-coated steel plate having a yield strength grade of ≥500 MPa and a high elongation.

BACKGROUND ART

Colour-coated plates in China are mainly used in the construction field, in which profiled housing wall sheets require a high strength, a good toughness and an excellent corrosion resistance. Many Chinese users (especially users in the construction industry) need colour-coated plates for structural use to, without loss of elongation, improve the strength of a structural member and reduce the weight, achieving a high strength, a reduced thickness and a reduced cost.

Among aluminium-zinc-hot-dipped steel plates produced in China at present, products having a higher yield strength and higher tensile strength all have a low elongation due to the limitation of process conditions, and in cases where the plasticity requirements are higher, these may not satisfy the requirements, which greatly limits the application and promotion of aluminium-zinc-hot-dipped steel plates.

For example, Chinese patent CN 102363857 B discloses a method for producing a 550 MPa-yield strength colour-coated plate for structural use, wherein Ti and Nb involved in the plate are at most 0.005% and 0.0045%, respectively, the yield strength $RP_{0.2}$ of the plate reaches 550-600 MPa, the tensile strength Rm is 560-610 MPa, and the elongation after fracture $A_{80}$ mm is ≥6%. The strengthening method for the plate mainly relates to retaining most of banded structures, which have not been recrystallized, by means of low-temperature annealing to increase the strength, resulting in the elongation after fracture being merely 6% and poorer plasticity.

Chinese patent CN 100529141 C discloses a full-hard aluminium-zinc-dipped steel plate and a production method for the full-hard aluminium-zinc-dipped steel plate, wherein the steel plate provided by the method has a yield strength reaching 600 MPa or higher, an elongation at fracture of ≤7% and a total content of Ti and Nb of 0.015-0.100%, and the annealing temperature is controlled at 630-710° C. to obtain the full-hard steel plate; however, the plasticity of the full-hard steel plate cannot meet the processing requirements for formability. The requirements of a yield strength of ≥500 MPa, a tensile strength of ≥550 MPa and an elongation after fracture of ≥15% cannot be met.

Chinese patent CN 200710093976.8 discloses an aluminium-zinc-hot-dipped steel plate for deep drawing and a production method for the aluminium-zinc-hot-dipped steel plate, wherein an IF steel substrate is used to produce the aluminium-zinc-hot-dipped product, and the substrate has ≤0.01% of a component C, which indicates that the steel is an ultra-low carbon steel, a yield strength of 140-220 MPa, a tensile strength reaching 260-350 MPa and an elongation of greater than 30%; however, the product cannot meet the requirements of a yield strength of ≥500 MPa and a tensile strength of ≥550 MPa.

Chinese patent CN 103911551 A discloses an aluminium-zinc-hot-dipped steel plate and a preparation method for the aluminium-zinc-hot-dipped steel plate, and products with a yield strength of 250-310 MPa, a tensile strength of 300-380 MPa and an elongation of ≥30% can be prepared, wherein the soaking time of the process for the steel plate is 40-120 s, which soaking time is too long, leading to grain coarsening, and the strength grade of the steel plate is low.

At present, there is a great demand for aluminium-zinc-dipped and colour-coated products in the fields such as the steel structure construction industry with the requirements of a high wind uplift resistance, a high corrosion resistance, a high strength and a high elongation. However, high-strength low-alloy aluminium-zinc-hot-dipped and colour-coated products with a yield strength of ≥500 MPa, a tensile strength of ≥550 MPa and an elongation of ≥15% are all blank all over the world.

SUMMARY OF THE INVENTION

An object of the present invention is to provide an aluminium-zinc-dipped and colour-coated steel plate having a 500 MPa yield strength grade and a high elongation and a production method for the aluminium-zinc-dipped and colour-coated steel plate having a 500 MPa yield strength grade and a high elongation, wherein the steel plate has excellent mechanical properties, i.e., a yield strength of ≥500 MPa, a tensile strength of ≥550 MPa and an elongation after fracture of ≥15%, the dipping layer is uniform and dense, and the product has not only a good toughness but also an excellent corrosion resistance, and can meet the requirements of high yield strength and high elongation for constructions, automobiles etc. The product can also be used for the electrical devices of home appliances, elevators etc., achieving a high strength and a reduced thickness.

In order to achieve the above-mentioned object, the technical solution of the present invention is:

an aluminium-zinc-hot-dipped and colour-coated steel plate having a 500 MPa yield strength grade and a high elongation, with the chemical components in mass percentage of a substrate of the steel plate being: 0.07-0.15% of C, 0.02-0.15% of Si, 1.3-1.8% of Mn, S≤0.01%, N≤0.004%, Ti≤0.15%, Nb≤0.050%, and the balance being Fe and other inevitable impurities, and meanwhile satisfying the conditions of:

(C+Mn/6)≥0.3%;
Mn/S≥150;
Nb satisfying 0.01%≤(Nb-0.22C-1.1N)≤0.05% where no Ti is contained;
Ti satisfying 0.5≤Ti/C≤1.5 where no Nb is contained; and 0.04%≤(Ti+Nb)≤0.2% where Ti and Nb are added in combination.

The microstructure of the steel plate of the present invention is a complex phase structure comprising ferrite, cementite and fine precipitates, and at least one structure of bainite, martensite and deformed banded grains.

The steel plate of the present invention has a yield strength of ≥500 MPa, a tensile strength of ≥550 MPa and an elongation after fracture of ≥15%.

In addition, the surface of the aluminium-zinc-hot-dipped steel plate of the present invention has fine, uniform silver-white spangles, and the grain diameter of the spangles is less than 10 mm, preferably less than 5 mm.

A coating layer coated on the surface of the colour-coated plate of the present invention is classified as a fluorocarbon, a polyester (PE), a silicon-modified polyester (SMP), a highly weather resistant polyester (HDP) or a polyvinylidene fluoride (PVDF) according to coating types.

In the composition design of the present invention:

In the present invention, a trace amount of alloying element Nb is added, which element can form precipitates such as Nb (C, N) in the steel. In the addition of simply Nb in the present invention, where the composition design satisfies the equation 0.01%≤(Nb−0.22C−1.1N)≤0.05%, Nb and C, N form a sufficient and fine intermediate phase, achieving a material strengthening effect.

C in the steel substrate of the present invention is the most effective and cheapest solid solution strengthening element, and the solid solution strengthening effect increases as the content of C increases. In addition, as described above, the addition of Nb to form fine NbC also effectively increases the strength of the material.

C and Si in the steel substrate of the present invention are the most effective and cheapest solid solution strengthening elements, and the solid solution strengthening effect increases as the contents of C and Si increase. However, Si can be enriched at the surface of the steel strip and is enriched more significantly than the C element, which seriously affects the wetting behaviour of the steel strip, so the content of Si needs to be strictly controlled.

In the present invention, Mn element is added, which element can, during cooling, reduce the phase change temperature, refine the ferrite grains, increase the interval of the recrystallization finish temperature and the phase change start temperature, increase the hardenability of the steel and allow for a bainite or martensite transformation during the post-hot-dipping cooling. The C equivalent in a carbon steel determines the strength properties, and the strength of the material is simply expressed as a carbon equivalent by means of the statistics of a large number of test data; therefore, (C+Mn/6)≥0.3% is required in the present invention. In addition, Mn in molten steel can be infinitely miscible, and Mn mainly has a solid solution strengthening effect; since a certain amount of S element remains in the molten steel, which element has the negative effects of increasing the hot brittleness of the slab, deteriorating the mechanical properties of the steel, etc., the Mn/S value of the steel plate has to be increased in order to reduce the negative effects of S, and therefore the content of Mn is controlled to be 150≤Mn/S in the present invention, so that the negative effects of S can be effectively reduced.

In the present invention, after the addition of Nb, a large amount of fine precipitates are dispersed in the substrate to strengthen the substrate. The addition of Mn element expands the austenite zone and improves the hardenability of the steel plate, and in conjunction with a post-dipping rapid cooling technique, some bainite or martensite strengthened phases can be obtained.

In the present invention, a trace amount of alloying element Ti is added, which element can form precipitates such as TiC and TiN in the steel. In the addition of simply Ti in the present invention, the composition design is 0.5≤Ti/C≤1.5, which can result in the formation of a large amount of special carbide TiC which is a good dispersion strengthening enhancer.

In the present invention, where a trace amount of alloying element of Ti and a trace amount of alloying element of Nb are added in combination, fine precipitates having strengthening effects, such as Nb(C, N), TiC, TiN and (Ti, Nb)(C, N), can be formed to strengthen the substrate.

The method for producing the aluminium-zinc-hot-dipped and colour-coated steel plate having a 500 MPa yield strength grade and a high elongation of the present invention comprises the steps of:

1) smelting and Casting smelting and casting the components above to obtain a cast slab;

2) hot-rolling and pickling wherein the heating tapping temperature is 1150-1280° C., the finish rolling temperature of the hot rolling is 830-890° C. and the hot rolling coiling temperature is 500-650° C.; and the cooling method after the hot rolling is water cooling;

3) cold-rolling cold-rolling to form a steel strip, wherein the overall reduction rate is controlled to 70-80%;

4) continuous annealing performing continuous annealing in a non-oxidation continuous annealing aluminium-zinc-hot-dipping furnace comprising a direct-fired heating section, a radiant tube heating section, a soaking section, a pre-hot-dipping cooling section, a hot tension roller zone and a hot-dipping section, and post-hot-dipping cooling, wherein the duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in an post-hot-dipping cooling section is 8-15 s; the duration in the hot tension roller zone and the hot-dipping section is 8-12 s; and the post-hot-dipping cooling rate is ≥20° C./s;

5) hot-dipping dipping the steel strip in a zinc pot for a hot-dipping treatment to obtain a high-strength low-alloy aluminium-zinc-hot-dipped steel strip, with the hot-dipping liquid comprising the components in weight percentage: 48-58% of Al, 40-50% of Zn, 1.0-2.0% of Si, 0.005-0.050% of Ti and the balance being inevitable impurities and the zinc pot temperature being 550-610° C.; and 6) skin pass rolling and withdrawing-straightening the temper rolling ratio being 0.25%±0.2 and the withdrawing-straightening ratio being 0.2%±0.2.

Furthermore, the method further comprises step 7): colour-coating, wherein the colour-coated coating layer is classified as a fluorocarbon, a polyester (PE), a silicon-modified polyester (SMP), a highly weather resistant polyester (HDP) or a polyvinylidene fluoride (PVDF).

Preferably, cold gas jet cooling or gas-mist jet cooling is used for the post-hot-dipping cooling in step 4).

The microstructure of the steel plate of the present invention is a complex phase structure comprising ferrite, cementite and fine precipitates, and at least one structure of bainite, martensite and deformed banded grains.

The steel plate of the present invention has a yield strength of ≥500 MPa, a tensile strength of ≥550 MPa and an elongation after fracture of ≥15%.

In the manufacturing method of the present invention, direct-flame rapid heating, short-term temperature holding and rapid cooling methods are used in the present invention to achieve a rapid heat treatment, refining the structure and improving the strength and elongation. A method of cold gas jet cooling or gas-mist jet cooling is used for the post-hot-dipping cooling, so that grain refinement can be achieved to obtain a strengthened phase.

Direct flame heating is used in the present invention, which improves the heating rate while shortening the temperature holding time to 1-10 s, inhibiting the grain growth, so that a rapid heat treatment can be achieved for grain refinement.

In the process of annealing aluminium-zinc-hot-dipping, fine precipitates have an effect of dislocation pinning and a hindering effect on subgrain boundary migration, inhibiting the growth of recrystallized grains and refining the grains, increasing the yield strength and tensile strength of the steel, thus achieving the purpose of strengthening the material while maintaining a good plasticity.

A post-dipping rapid cooling is carried out by means of gas jet cooling or gas-mist jet cooling to refine grains and obtain a strengthened phase. The gas-mist jet cooling refers to adding a water mist of fine droplets to a protecting gas for gas jet cooling, and then jetting same to the surface of the strip steel at a certain angle and speed, so that the efficiency of heat exchange on the surface of the strip steel is greatly increased.

Direct-flame rapid heating, short-term temperature holding and rapid cooling methods are used in the present invention to achieve a rapid heat treatment, refining the structure and improving the strength and elongation.

The overall cold-rolling reduction rate is controlled to 70-80%. Given an appropriate composition and a hot-rolling process, it is impossible to obtain a desired metallographic structure unless an appropriate cold-rolling reduction is ensured. Since when the cold-rolling reduction is lower, the deformation energy storage is small, and recrystallization is not easy to occur during the subsequent recrystallization, a certain amount of cold-rolled structure can be appropriately retained to improve the strength. The use of a larger reduction rate of 70-80% can accelerate the recrystallization, improving the plasticity.

The continuous annealing is carried out in a non-oxidation continuous annealing aluminium-zinc-hot-dipping furnace comprising a direct-fired heating section, a radiant tube heating section, a soaking section, a pre-hot-dipping cooling section, a hot tension roller zone and a hot-dipping section, and cold gas jet cooling or gas-mist jet cooling is carried out after the hot-dipping. The duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in the post-hot-dipping cooling section is 8-15 s; and the duration in the hot tension roller zone and the hot-dipping section is 8-12 s.

Direct flame heating is used in the present invention, which improves the heating rate while shortening the temperature holding time to 1-10 s, inhibiting the grain growth, so that a rapid heat treatment can be achieved for grain refinement. Due to the addition of an alloy, the high-strength low-alloy steel is quite sensitive to the annealing temperature, so the temperature and holding time in each section of the annealing section should be strictly controlled.

Upon testing, the aluminium-zinc-hot-dipped and colour-coated steel plate having a 500 MPa grade and a high elongation manufactured in the present invention has a yield strength of 500-590 MPa, a tensile strength of ≥550 MPa and an elongation at break of ≥15%. After aluminium-zinc-hot-dipping, the substrate is a uniform complex phase structure of ferrite+cementite+bainite+martensite+deformed banded grains+fine precipitates, and the surface of the steel plate has fine, uniform silver-white spangles; after being colour-coated, the surface does not have the defects of bubbles, cracks, holidays, etc., which are harmful to use. A coating layer coated on the surface of the colour-coated plate can be classified as a fluorocarbon, a polyester (PE), a silicon-modified polyester (SMP), a highly weather resistant polyester (HDP) or a polyvinylidene fluoride (PVDF) according to coating types, without any obvious defects.

Compared with the prior art, the present invention does not need any equipment transformation, has a simple manufacturing process and can manufacture an aluminium-zinc-hot-dipped product having not only a high corrosion resistance and heat resistance but also an excellent toughness, and the product of the present invention has a high strength and a good plasticity; furthermore, the dipping layer of the steel plate of the present invention is uniform, dense and appropriate in thickness, and after optional colour-coating, a good glossiness is present, so that the product can be widely used in the industry of constructions, home appliances, etc., expanding a broad area for the application of aluminium-zinc-dipped and colour-coated products.

DETAILED DESCRIPTION OF EMBODIMENTS

Figure 1:
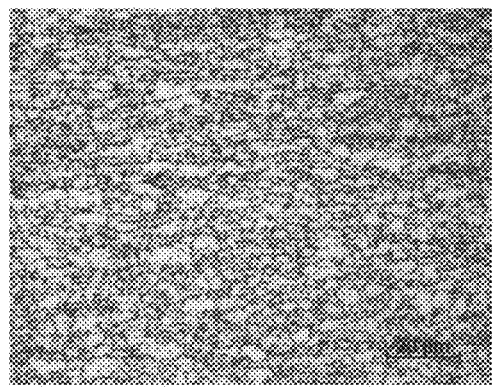
FIG. 1 is a metallograph of a steel substrate of Example 1 of the present invention.

The present invention is further described in detail in conjunction with the accompanying drawings and examples.

Table 1 relates to the chemical compositions of the steel substrate of the steel strip and dipping layers of the examples of the present invention, with the balances being Fe and inevitable impurities. The components above are subjected to molten iron desulphurization, converter smelting and casting to obtain a cast slab; subsequently, the cast slab is hot-rolled and cold-rolled, and subjected to continuous annealing, hot-dipping, skin pass rolling and withdrawing-straightening to finally obtain an aluminium-zinc-hot-dipped plate; optionally, the aluminium-zinc-hot-dipped plate is further colour-coated to obtain a colour-coated steel plate.

For the specific process conditions of the examples of the present invention, reference can be made to tables 2 and 3. Table 3 relates to the continuous annealing process conditions of the examples of the present invention. Table 4 relates to the mechanical properties of the steel plates of the examples of the present invention.

TABLE 1

| | Percentage by weight (wt %) | | | | | | | | | | |
|---|---|---|---|---|---|---|---|---|---|---|---|
| | Steel substrate composition | | | | | | | Dipping layer composition | | | |
| | C | Si | Mn | N | S | Ti | Nb | Al | Zn | Si | Ti |
| Example 1 | 0.12 | 0.075 | 1.3 | 0.0015 | 0.008 | 0.001 | 0.045 | 48 | 50 | 1.1 | 0.01 |
| Example 2 | 0.12 | 0.075 | 1.5 | 0.0015 | 0.008 | 0.001 | 0.045 | 49 | 49 | 1.1 | 0.02 |
| Example 3 | 0.08 | 0.092 | 1.7 | 0.0018 | 0.006 | 0.006 | 0.045 | 52 | 45 | 2 | 0.05 |
| Example 4 | 0.13 | 0.045 | 1.4 | 0.0018 | 0.006 | 0.140 | 0.001 | 52 | 45 | 2 | 0.05 |
| Example 5 | 0.09 | 0.050 | 1.6 | 0.0018 | 0.006 | 0.001 | 0.042 | 53 | 44 | 2 | 0.05 |
| Example 6 | 0.11 | 0.120 | 1.6 | 0.0018 | 0.006 | 0.031 | 0.030 | 53 | 44 | 2 | 0.03 |

TABLE 2

| | Heating tapping temperature/° C. | Finish rolling temperature of hot rolling/° C. | Coiling temperature/° C. | Cold rolling reduction/% |
|---|---|---|---|---|
| Example 1 | 1230 | 860 | 550 | 80 |
| Example 2 | 1230 | 860 | 550 | 80 |
| Example 3 | 1200 | 880 | 630 | 71 |
| Example 4 | 1170 | 810 | 510 | 76 |
| Example 5 | 1250 | 890 | 640 | 80 |
| Example 6 | 1250 | 860 | 620 | 80 |

TABLE 3

| | Temperature in direct-fired section/° C. | Duration in direct-fired section/s | Temperature in radiant heating section/° C. | Duration in radiant heating section/s | Holding temperature/° C. | Holding times/s | Post-hot-dipping cooling rate/° C./s |
|---|---|---|---|---|---|---|---|
| Example 1 | 680 | 28 | 790 | 38 | 790 | 3 | 30 |
| Example 2 | 680 | 28 | 785 | 38 | 785 | 4 | 25 |
| Example 3 | 690 | 31 | 835 | 42 | 835 | 4 | 31 |
| Example 4 | 680 | 28 | 785 | 38 | 785 | 4 | 31 |
| Example 5 | 680 | 44 | 755 | 43 | 755 | 8 | 31 |
| Example 6 | 680 | 28 | 790 | 38 | 790 | 4 | 31 |

TABLE 4

| | Yield strength/MPa | Tensile strength/MPa | Elongation/% | Thickness/mm |
|---|---|---|---|---|
| Example 1 | 543 | 586 | 17 | 0.5 |
| Example 2 | 537 | 571 | 15.5 | 0.45 |
| Example 3 | 534 | 591 | 15.8 | 0.6 |
| Example 4 | 524 | 581 | 16.1 | 0.6 |
| Example 5 | 511 | 572 | 16.8 | 0.5 |
| Example 6 | 513 | 578 | 15.6 | 0.5 |

Example 1

This example relates to a method for producing an aluminium-zinc-hot-dipped and colour-coated steel plate having a 500 MPa yield strength grade and a high elongation, with the steel plate having a thickness of 0.5 mm after being colour-coated, the method comprising the steps of:

1) smelting: performing molten iron desulphurization, converter smelting and casting to obtain a cast slab having chemical components in weight percentage: 0.12% of C, 0.075% of Si, 1.3% of Mn, S≤0.01%, N≤0.004%, Ti≤0.001%, 0.045% of Nb, and the balance being Fe and other inevitable impurities.

2) hot-rolling and pickling wherein the heating tapping temperature is 1230° C., the finish rolling temperature of hot rolling is 860° C. and the hot rolling coiling temperature is 550° C. Water quenching cooling is carried out before coiling, and the hot-rolled plate has a thickness of 2.3 mm;

3) cold-rolling, wherein the overall reduction rate is controlled to 80%, and the cold-rolled plate has a thickness of 0.46 mm;

4) continuous annealing performing continuous annealing in a non-oxidation continuous annealing furnace comprising a direct-fired heating section, a radiant tube heating section, a radiant tube soaking treatment and a cooling treatment. wherein the duration in the direct-fired heating section is 28 s; the heating temperature is 680° C., and the radiant tube heating time is 38 s; the soaking temperature is 790° C., and the soaking time is 3 s; and the cooling temperature is 600° C., and the cooling time is 11 s;

5) aluminium-zinc-hot-dipping, wherein the hot-dipped aluminium-zinc metal layers on both sides are controlled to a weight of 150 g/m$^2$, with the components of the dipping layer being, in weight percentage: 489% of Al, 50% of Zn, 1.1% of Si, 0.01% of Ti, and the balance being impurities; the temperature of the strip steel when entering the zinc pot is controlled at 600° C. and the temperature of an aluminium zinc liquid is controlled at 600° C.; the post-hot-dipping cooling method is gas-mist jet cooling; and 6) skin pass rolling, withdrawing-straightening and coiling for use; and 7) optionally, colour-coating. The final product has a thickness of 0.5 mm.

After test detection, the yield strength $RP_{0.2}$ of the steel plate of this example is 543 MPa, the tensile strength Rm is 586 MPa, and the elongation after fracture $A_{80}$ mm is 17%.

The substrate of this example is a uniform complex phase structure of ferrite+cementite+bainite+martensite+deformed banded grains+fine precipitates (see FIG. 1).

Example 2

This example relates to a method for producing an aluminium-zinc-hot-dipped and colour-coated steel plate having a 500 MPa yield strength grade and a high elongation, with the steel plate having a thickness of 0.45 mm after being colour-coated, the method comprising the steps of:

1) smelting: performing molten iron desulphurization, converter smelting and casting to obtain a cast slab having chemical components in weight percentage: 0.11% of C, 0.075% of Si, 1.5% of Mn, S≤0.01%, N≤0.004%, Ti≤0.001%, 0.045% of Nb, and the balance being Fe and other inevitable impurities;

2) hot-rolling and pickling wherein the heating tapping temperature is 1230° C., the finish rolling temperature of hot rolling is 860° C. and the hot rolling coiling temperature is 550° C. Water quenching cooling is carried out before coiling; and the hot-rolled plate has a thickness of 2.1 mm;

3) cold-rolling, wherein the overall reduction rate is controlled to 80%, and the cold-rolled plate has a thickness of 0.41 mm;

4) continuous annealing wherein continuous annealing is performed in a non-oxidation continuous annealing furnace comprising a direct-fired heating section, a radiant tube heating section, a radiant tube soaking treatment and a cooling treatment, the duration in the direct-fired heating section is 28 s; the heating temperature is 680° C., and the induction heating time is 38 s; the soaking temperature is 785° C., and the soaking time is 4 s; and the cooling temperature is 600° C., and the cooling time is 11 s;

5) aluminium-zinc-hot-dipping, wherein the hot-dipped aluminium-zinc metal layers on both sides are controlled to a weight of 150 g/m$^2$, with the components of the dipping layer being, in weight percentage: 49% of Al, 49% of Zn, 1.1% of Si and 0.02% of Ti; the temperature of the strip steel when entering the zinc pot is controlled at 600° C. and the temperature of an aluminium zinc liquid is controlled at 590° C.; the post-hot-dipping cooling method is gas-mist jet cooling; and 6) skin pass rolling, withdrawing-straightening and coiling for use;

7) optionally, colour-coating. The final product has a thickness of 0.45 mm.

After test detection, the yield strength $RP_{0.2}$ of the steel plate of this example is 537 MPa, the tensile strength Rm is 571 MPa, and the elongation after fracture $A_{80}$ mm is 15.5%.

Figure 2:
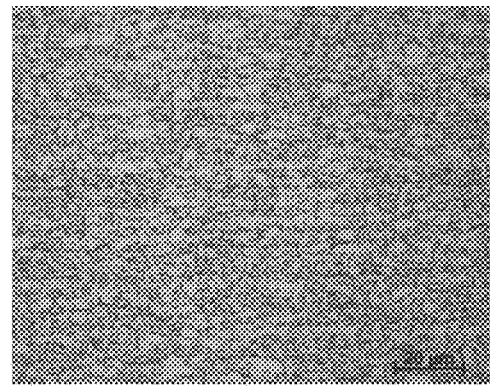
FIG. 2 is a metallograph of a steel substrate of Example 2 of the present invention.

The substrate of this example is a uniform complex phase structure of ferrite+cementite+bainite+martensite+deformed banded grains+fine precipitates (see FIG. 2).

Example 3

This example relates to a method for producing an aluminium-zinc-hot-dipped and colour-coated steel plate having a 500 MPa yield strength grade and a high elongation, with the steel plate having a thickness of 0.5 mm after being colour-coated, the method comprising the steps of:

1) smelting: wherein molten iron desulphurization, converter smelting and casting are performed to obtain a cast slab having chemical components in weight percentage: 0.08% of C, 0.092% of Si, 1.7% of Mn, S≤0.01%, N≤0.004%, 0.006% of Ti, 0.045% of Nb, and the balance being Fe and other inevitable impurities.

2) hot-rolling and pickling wherein the heating tapping temperature is 1200° C., the finish rolling temperature of hot rolling is 880° C. and the hot rolling coiling temperature is 630° C. Water quenching cooling is carried out before coiling; and the hot-rolled plate has a thickness of 1.93 mm;

3) cold-rolling, wherein the overall reduction rate is controlled to 71%, and the cold-rolled plate has a thickness of 0.56 mm;

4) continuous annealing wherein continuous annealing is performed in a non-oxidation continuous annealing furnace comprising a direct-fired heating section, a radiant tube heating section, a radiant tube soaking treatment and a cooling treatment, the duration in the direct-fired heating section is 31 s; the heating temperature is 690° C., and the radiant tube heating time is 42 s; the soaking temperature is 835° C., and the soaking time is 4 s; and the cooling temperature is 600° C., and the cooling time is 11 s;

5) aluminium-zinc-hot-dipping, wherein the hot-dipped aluminium-zinc metal layers on both sides are controlled to a weight of 150 g/m$^2$, with the components of the dipping layer being, in weight percentage: 52% of Al, 45% of Zn, 2% of Si, 0.05% of Ti, and the balance being impurities; the temperature of the strip steel when entering the zinc pot is controlled at 600° C. and the temperature of an aluminium zinc liquid is controlled at 560° C.; the post-hot-dipping cooling method is gas-mist jet cooling; and 6) skin pass rolling, withdrawing-straightening and coiling for use; and 7) optionally, colour-coating. The final product has a thickness of 0.6 mm.

After test detection, the yield strength $RP_{0.2}$ of the steel plate of this example is 534 MPa, the tensile strength Rm is 591 MPa, and the elongation after fracture $A_{80}$ mm is 15.8%.

The substrate of this example is a uniform complex phase structure of ferrite+cementite+bainite+martensite+deformed banded grains+fine precipitates.

Example 4

This example relates to a method for producing an aluminium-zinc-hot-dipped and colour-coated steel plate having a 500 MPa yield strength grade and a high elongation, with the steel plate having a thickness of 0.45 mm after being colour-coated, the method comprising the steps of:

1) smelting: wherein molten iron desulphurization, converter smelting and casting are performed to obtain a cast slab having chemical components in weight percentage: 0.13% of C, 0.045% of Si, 1.4% of Mn, S≤0.01%, N≤0.004%, 0.14% of Ti, 0.001% of Nb, and the balance being Fe and other inevitable impurities;

2) hot-rolling and pickling wherein the heating tapping temperature is 1170° C., the finish rolling temperature of hot rolling is 810° C. and the hot rolling coiling temperature is 510° C. Water quenching cooling is carried out before coiling; and the hot-rolled plate has a thickness of 2.3 mm;

3) cold-rolling, wherein the overall reduction rate is controlled to 76%, and the cold-rolled plate has a thickness of 0.56 mm;

4) continuous annealing wherein continuous annealing is performed in a non-oxidation continuous annealing furnace comprising a direct-fired heating section, a radiant tube heating section, a radiant tube soaking treatment and a cooling treatment, the duration in the direct-fired heating section is 31 s; the heating temperature is 680° C., and the induction heating time is 38 s; the soaking temperature is 785° C., and the soaking time is 4 s; and the cooling temperature is 600° C., and the cooling time is 11 s;

5) aluminium-zinc-hot-dipping, wherein the hot-dipped aluminium-zinc metal layers on both sides are controlled to a weight of 150 g/m$^2$, with the components of the dipping layer being, in weight percentage: 52% of Al, 45% of Zn, 2% of Si and 0.05% of Ti; the temperature of the strip steel when entering the zinc pot is controlled at 600° C. and the temperature of an aluminium zinc liquid is controlled at 605° C.; the post-hot-dipping cooling method is gas-mist jet cooling; and 6) skin pass rolling, withdrawing-straightening and coiling for use;

7) optionally, colour-coating. The final product has a thickness of 0.6 mm.

After test detection, the yield strength $RP_{0.2}$ of the steel plate of this example is 524 MPa, the tensile strength Rm is 581 MPa, and the elongation after fracture $A_{80}$ mm is 16.1%.

The substrate of this example is a uniform complex phase structure of ferrite+cementite+bainite+martensite+deformed banded grains+fine precipitates.

Example 5

This example relates to a method for producing an aluminium-zinc-hot-dipped and colour-coated steel plate having a 500 MPa yield strength grade and a high elongation, with the steel plate having a thickness of 0.5 mm after being colour-coated, the method comprising the steps of:

1) smelting: wherein molten iron desulphurization, converter smelting and casting are performed to obtain a cast slab having chemical components in weight percentage: 0.09% of C, 0.05% of Si, 1.6% of Mn, S≤0.01%, N≤0.004%, 0.001% of Ti, 0.042% of Nb, and the balance being Fe and other inevitable impurities.

2) hot-rolling and pickling wherein the heating tapping temperature is 1250° C., the finish rolling temperature of hot rolling is 890° C. and the hot rolling coiling temperature is 640° C. Water quenching cooling is carried out before coiling; and the hot-rolled plate has a thickness of 2.3 mm;

3) cold-rolling, wherein the overall reduction rate is controlled to 80%, and the cold-rolled plate has a thickness of 0.46 mm;

4) continuous annealing wherein continuous annealing is performed in a non-oxidation continuous annealing furnace comprising a direct-fired heating section, a radiant tube heating section, a radiant tube soaking treatment and a cooling treatment, the duration in the direct-fired heating section is 44 s; the heating temperature is 680° C., and the radiant tube heating time is 43 s; the soaking temperature is 755° C., and the soaking time is 8 s; and the cooling temperature is 600° C., and the cooling time is 11 s;

5) aluminium-zinc-hot-dipping, wherein the hot-dipped aluminium-zinc metal layers on both sides are controlled to a weight of 150 g/m², with the components of the dipping layer being, in weight percentage: 53% of Al, 44% of Zn, 2% of Si, 0.05% of Ti, and the balance being impurities; the temperature of the strip steel when entering the zinc pot is controlled at 600° C. and the temperature of an aluminium zinc liquid is controlled at 600° C.; the post-hot-dipping cooling method is gas-mist jet cooling; and 6) skin pass rolling, withdrawing-straightening and coiling, and Packaging procedure for use; and 7) optionally, colour-coating. The final product has a thickness of 0.5 mm.

After test detection, the yield strength $RP_{0.2}$ of the steel plate of this example is 511 MPa, the tensile strength Rm is 572 MPa, and the elongation after fracture $A_{80}$ mm is 16.8%.

The substrate of this example is a uniform complex phase structure of ferrite+cementite+bainite+martensite+deformed banded grains+fine precipitates.

Example 6

This example relates to a method for producing an aluminium-zinc-hot-dipped and colour-coated steel plate having a 500 MPa yield strength grade and a high elongation, with the steel plate having a thickness of 0.45 mm after being colour-coated, the method comprising the steps of:

1) smelting: wherein molten iron desulphurization, converter smelting and casting are performed to obtain a cast slab having chemical components in weight percentage: 0.11% of C, 0.12% of Si, 1.6% of Mn, S≤0.01%, N≤0.004%, 0.031% of Ti, 0.030% of Nb, and the balance being Fe and other inevitable impurities;

2) hot-rolling and pickling wherein the heating tapping temperature is 1250° C., the finish rolling temperature of hot rolling is 860° C. and the hot rolling coiling temperature is 620° C. Water quenching cooling is carried out before coiling; and the hot-rolled plate has a thickness of 2.3 mm;

3) cold-rolling, wherein the overall reduction rate is controlled to 80%, and the cold-rolled plate has a thickness of 0.46 mm;

4) continuous annealing wherein continuous annealing is performed in a non-oxidation continuous annealing furnace comprising a direct-fired heating section, a radiant tube heating section, a radiant tube soaking treatment and a cooling treatment, the duration in the direct-fired heating section is 28 s; the heating temperature is 680° C., and the induction heating time is 38 s; the soaking temperature is 790° C., and the soaking time is 4 s; and the cooling temperature is 600° C., and the cooling time is 11 s;

5) aluminium-zinc-hot-dipping, wherein the hot-dipped aluminium-zinc metal layers on both sides are controlled to a weight of 150 g/m², with the components of the dipping layer being, in weight percentage: 53% of Al, 44% of Zn, 2% of Si and 0.05% of Ti; the temperature of the strip steel when entering the zinc pot is controlled at 600° C. and the temperature of an aluminium zinc liquid is controlled at 560° C.; the post-hot-dipping cooling method is gas-mist jet cooling; and 6) skin pass rolling, withdrawing-straightening and coiling for use;

7) optionally, colour-coating. The final product has a thickness of 0.5 mm.

After test detection, the yield strength $RP_{0.2}$ of the steel plate of this example is 513 MPa, the tensile strength Rm is 578 MPa, and the elongation after fracture $A_{80}$ mm is 15.6%.

The substrate of this example is a uniform complex phase structure of ferrite+cementite+bainite+martensite+deformed banded grains+fine precipitates.

The invention claimed is:

1. An aluminium-zinc-hot-dipped steel plate having a yield strength of ≥500 MPa and a high elongation, with the chemical components in mass percentage of a substrate of the steel plate consisting of: 0.07-0.15% of C, 0.02-0.5% of Si, 1.3-1.8% of Mn, N≤0.004%, S≤0.01%, Ti≤0.15%, Nb≤0.050%, and the balance being Fe and other inevitable impurities, wherein said chemical components satisfy formulae provided as follows:

(C+Mn/6)≥0.3%;

Mn/S≥150;

0.01%≤(Nb-0.22C-1.1 N)≤0.05%;

0.5≤Ti/C≤1.5; and 0.04%≤(Ti+Nb)≤0.2%; and wherein the steel plate has a microstructure which is a complex phase structure comprising ferrite, cementite, fine precipitates, bainite, martensite and deformed banded grains.

2. The aluminium-zinc-hot-dipped steel plate of claim 1, wherein said steel plate has a tensile strength of ≥550 MPa and an elongation after fracture of ≥15%.

3. The aluminium-zinc-hot-dipped steel plate of claim 1, wherein the aluminium-zinc-hot-dipped steel plate has fine, uniform silver-white spangles on its surface.

4. The aluminium-zinc-hot-dipped steel plate of claim 3, wherein the spangles has a grain diameter that is less than 10 mm.

5. The aluminium-zinc-hot-dipped steel plate of claim 4, wherein the spangles have a grain diameter that is less than 5 mm.

6. The aluminium-zinc-hot-dipped steel plate of claim 1, wherein the aluminium-zinc-hot-dipped steel plate has a dipping layer with the components in weight percentage being: 48-58% of Al, 40-50% of Zn, 1.0-2.0% of Si, 0.005-0.050% of Ti, and the balance being inevitable impurities.

7. A steel plate comprising the aluminium-zinc-hot-dipped steel plate of claim 1 with a coating layer coated on its surface.

8. The steel plate of claim 7, wherein the coating layer comprises a fluorocarbon, a polyester, a silicon-modified polyester, a highly weather resistant polyester, or a polyvinylidene fluoride.

9. The steel plate of claim 7, wherein the aluminium-zinc-hot-dipped steel plate has a tensile strength of ≥550 MPa and an elongation after fracture of ≥15%.

10. The steel plate of claim 7, wherein the aluminium-zinc-hot-dipped steel plate has fine, uniform silver-white spangles on its surface.

11. The steel plate of claim 7, wherein the spangles have a grain diameter that is less than 10 mm.

12. The steel plate of claim 7, wherein the aluminium-zinc-hot-dipped steel plate has a dipping layer with the components in weight percentage being: 48-58% of Al, 40-50% of Zn, 1.0-2.0% of Si, 0.005-0.050% of Ti, and the balance being inevitable impurities.

13. A method for producing the aluminium-zinc-hot-dipped steel plate of claim 1, said method comprising the steps of:
  1) smelting and casting the components according to claim 1 to obtain the cast slab;
  2) hot-rolling and pickling the casting slab from step 1, wherein the heating tapping temperature is 1150-1280° C., the finish rolling temperature of the hot rolling is 800-900° C. and the hot rolling coiling temperature is 500-650° C.; and a cooling method after the hot rolling, which method is water cooling;
  3) cold-rolling to form a steel strip with a rolling reduction of 70-80%;
  4) continuous annealing in a non-oxidation continuous annealing aluminium-zinc-hot-dipping furnace comprising a direct-fired heating section, a radiant tube heating section, a soaking section, a pre-hot-dipping cooling section, a hot tension roller zone and a hot-dipping section, and post-hot-dipping cooling, wherein the duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in the post-hot-dipping cooling section is 8-15 s; the duration in the hot tension roller zone and the hot-dipping section is 8-12 s; and the post-hot-dipping cooling rate is ≥20° C./s;
  5) hot-dipping the steel strip in a zinc pot for a hot-dipping treatment to obtain a high-strength low-alloy aluminium-zinc-hot-dipped steel strip, with the components in weight percentage of the hot-dipping liquid being: 48-58% of Al, 40-50% of Zn, 1.0-2.0% of Si, 0.005-0.050% of Ti and the balance being inevitable impurities, and the zinc pot temperature being 550-610° C.; and
  6) skin pass rolling and withdrawing-straightening, the temper rolling ratio being 0.25%±0.2 and a withdrawing-straightening ratio being 0.2%±0.2.

14. The method of claim 13, further comprising step 7: coating with a coating layer selected from the group consisting of a fluorocarbon, a polyester, a silicon-modified polyester, a highly weather resistant polyester, and a polyvinylidene fluoride.

15. The method of claim 14, wherein, after being coated, the coating surface does not have the defects of bubbles, cracks and holidays.

16. The method of claim 13, wherein cold gas jet cooling or gas-mist jet cooling is used for the post-hot-dipping cooling in step 4).

17. The method of claim 13, wherein said steel plate has a tensile strength of ≥550 MPa and an elongation after fracture of ≥15%.

18. The method of claim 13, the aluminium-zinc-hot-dipped steel plate has fine, uniform silver-white spangles on its surface.

19. The method of claim 18, wherein the spangles has a grain diameter that is less than 10 mm.

* * * * *